United States Patent
Cheng et al.

(10) Patent No.: US 11,880,058 B2
(45) Date of Patent: Jan. 23, 2024

(54) SIDE-TYPE BACKLIGHT MODULE AND LIQUID CRYSTAL DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Pengfei Cheng, Beijing (CN); Jingfu Tao, Beijing (CN); Lu Yu, Beijing (CN); Kangle Chang, Beijing (CN); Jinzhao Zhou, Beijing (CN); Jian Sang, Beijing (CN); Heling Zhu, Beijing (CN); Yinwei Chen, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

(*) Notice: Subject to any disclaimer, the term of this patent is extended or adjusted under 35 U.S.C. 154(b) by 18 days.

(21) Appl. No.: 17/773,589

(22) PCT Filed: Apr. 23, 2021

(86) PCT No.: PCT/CN2021/089418
§ 371 (c)(1),
(2) Date: Apr. 29, 2022

(87) PCT Pub. No.: WO2021/213514
PCT Pub. Date: Oct. 28, 2021

(65) Prior Publication Data
US 2022/0373730 A1    Nov. 24, 2022

(30) Foreign Application Priority Data

Apr. 24, 2020  (CN) .......................... 202010334583.7

(51) Int. Cl.
*F21V 8/00* (2006.01)

(52) U.S. Cl.
CPC ......... *G02B 6/0053* (2013.01); *G02B 6/0036* (2013.01)

(58) Field of Classification Search
CPC ............................. G02B 6/0036; G02B 6/0053
See application file for complete search history.

(56) References Cited

U.S. PATENT DOCUMENTS

| 2005/0185423 A1 | 8/2005 | Miyashita et al. |
| 2011/0069253 A1 | 3/2011 | Murao et al. |

(Continued)

FOREIGN PATENT DOCUMENTS

| CN | 1664672 A | 9/2005 |
| CN | 209803492 U | 12/2019 |

(Continued)

OTHER PUBLICATIONS

Office Action for the Chinese Patent Application No. 202010334583.7 issued by the Chinese Patent Office dated Nov. 2, 2021.

*Primary Examiner* — Christopher E Dunay
(74) *Attorney, Agent, or Firm* — IP & T GROUP LLP (57) ABSTRACT

A side-type backlight module includes a light guide plate and a reverse prism sheet that are stacked. The reverse prism sheet includes a first prism. A surface of the first prism proximate to the light guide plate includes a plurality of prism structures substantially parallel to each other. Each prism structure protrudes toward a direction approaching the light guide plate. A surface of the light guide plate proximate to the reverse prism sheet includes a plurality of strip-shaped microstructures substantially parallel to each other. Each strip-shaped microstructure protrudes toward a direction (Continued)

approaching the reverse prism sheet. An extending direction of the prism structure crosses an extending direction of the strip-shaped microstructure.

18 Claims, 9 Drawing Sheets

(56) References Cited

U.S. PATENT DOCUMENTS

| | | | |
|---|---|---|---|
| 2015/0226901 A1* | 8/2015 | Lee | G02B 6/0036 |
| | | | 362/606 |
| 2015/0301257 A1* | 10/2015 | Choi | F21V 3/049 |
| | | | 359/885 |
| 2017/0003436 A1* | 1/2017 | Inoue | G02B 6/00 |
| 2019/0004237 A1* | 1/2019 | Kitano | B32B 27/20 |
| 2019/0235150 A1* | 8/2019 | Hsu | G02B 6/0088 |
| 2020/0134283 A1* | 4/2020 | Qing | G06V 40/1324 |
| 2021/0181580 A1* | 6/2021 | Chen | G02B 6/003 |
| 2021/0191176 A1 | 6/2021 | Zhou et al. | |
| 2021/0216741 A1* | 7/2021 | Zhang | G06V 10/54 |

FOREIGN PATENT DOCUMENTS

| | | |
|---|---|---|
| CN | 110678874 A | 1/2020 |
| CN | 110687720 A | 1/2020 |
| CN | 110991409 A | 4/2020 |
| CN | 111007680 A | 4/2020 |
| CN | 111487708 A | 8/2020 |

* cited by examiner

SIDE-TYPE BACKLIGHT MODULE AND LIQUID CRYSTAL DISPLAY APPARATUS

CROSS-REFERENCE TO RELATED APPLICATIONS

This application is a national phase entry under 35 USC 371 of International Patent Application No. PCT/CN2021/089418 filed on Apr. 23, 2021, which claims priority to Chinese Patent Application No. 202010334583.7, filed on Apr. 24, 2020, which are incorporated herein by reference in their entirety.

TECHNICAL FIELD

The present disclosure relates to the field of display technologies, and in particular, to a side-type backlight module and a liquid crystal display apparatus.

BACKGROUND

With the continuous development of terminal technology, functions of electronic devices such as mobile phones tend to be diversified, and users' requirements for screen size are getting higher and higher. In order to pursue a higher screen-to-body ratio and then provide users with a better user experience, more and more electronic devices adopt an under-screen fingerprint recognition technology.

Figure 1:
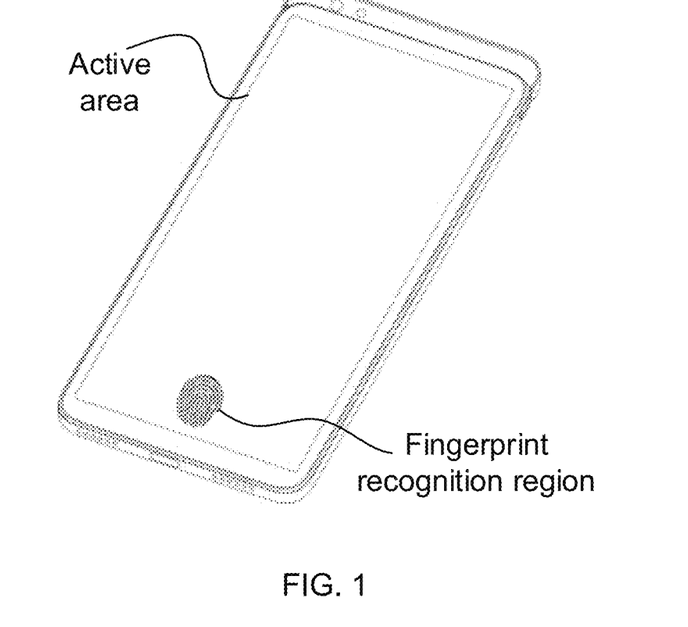
FIG. 1 is a structural diagram of an electronic device in which a texture recognition region is set outside an active area separately, in the prior art.

The under-screen fingerprint recognition technology refers to a technology that completes fingerprint recognition under a screen. With reference to FIG. 1, a texture recognition region is provided in an active area (AA), so as to increase the screen-to-body ratio. At present, an optical fingerprint recognition technology has become one of the most important implementations of under-screen fingerprint recognition, which mainly uses principles of refraction and reflection of light to achieve fingerprint recognition.

SUMMARY

In one aspect, a side-type backlight module is provided. The side-type backlight module includes a light guide plate and a reverse prism sheet that are stacked. The reverse prism sheet includes a first prism. A surface of the first prism proximate to the light guide plate includes a plurality of prism structures substantially parallel to each other, and each prism structure protrudes toward a direction approaching the light guide plate. A surface of the light guide plate proximate to the reverse prism sheet includes a plurality of strip-shaped microstructures substantially parallel to each other. Each strip-shaped microstructure protrudes toward a direction approaching the reverse prism sheet. An extending direction of the prism structure crosses an extending direction of the strip-shaped microstructure.

In some embodiments, the strip-shaped microstructure is an arched structure. A top portion of the arched structure is toward a direction of approaching the reverse prism sheet.

In some embodiments, the side-type backlight module further includes: a first light source in a strip shape and a reflective sheet. The first light source is disposed on a side of the light guide plate. An extending direction of the first light source is the same as the extending direction of the prism structure. The reflective sheet is disposed on a surface of the light guide plate away from the reverse prism sheet.

In some embodiments, the reverse prism sheet further includes a second prism or an optical film that is disposed on a surface of the first prism away from the light guide plate, and the second prism or the optical film is obtained by haze treatment.

In some embodiments, a surface of the second prism or the optical film away from the first prism is a haze surface.

In some embodiments, a thickness of the second prism or the optical film is within a range of 5 μm to 7 μm, inclusive.

In some embodiments, the prism structure has a protruding corner protruding toward the direction approaching the light guide plate. A section of the protruding corner taken along a direction perpendicular to the extending direction of the prism structure has two edges connected to each other. An include angle between the two edges is within a range of 56 degrees to 75 degrees, inclusive.

In some embodiments, a surface of the light guide plate away from the reverse prism sheet includes a plurality of wedge-shaped structures arranged at intervals.

In some embodiments, a plane where a flat portion, without the plurality of wedge-shaped structures, of the surface of the light guide plate away from the reverse prism sheet is located is a reference plane. A wedge-shaped structure of the plurality of wedge-shaped structures includes a first inclined surface forming a first angle with the reference surface and a second inclined surface forming a second angle with the reference surface. The first angle and the second angle are both an acute angle. The first angle is greater than the second angle. The second angle is within a range of 1 degree to 5 degrees, inclusive.

In some embodiments, a distribution density of wedge-shaped structures of the plurality of wedge-shaped structures of the light guide plate at a position proximate to the first light source is less than a distribution density of wedge-shaped structures of the plurality of wedge-shaped structures of the light guide plate at a position away from the first light source.

In some embodiments, the extending direction of the prism structure is perpendicular to the extending direction of the strip-shaped microstructure.

In another aspect, a liquid crystal display apparatus is provided. The liquid crystal display apparatus includes the side-type backlight module according to any one of the above embodiments, and further includes: a liquid crystal display panel disposed on a light exit side of the side-type backlight module, and a texture recognition layer on a surface of the side-type backlight module away from the liquid crystal display panel.

In some embodiments, the liquid crystal display apparatus further includes a lens layer. The lens layer is disposed between the texture recognition layer and the side-type backlight module.

In some embodiments, the lens layer is a single lens or a lens group.

In some embodiments, the single lens is an aspheric single lens.

In some embodiments, an aspheric surface of the single lens is one of a quadric surface, an even-order aspheric surface and a free-form surface.

In some embodiments, the liquid crystal display apparatus further includes at least one second light source disposed on a side of the lens layer. The second light source(s) is capable of emitting invisible light.

In some embodiments, the second light source is capable of emitting infrared light or near-infrared light.

In some embodiments, a center wavelength of the light emitted by the second light source is 940 nm.

In some embodiments, the liquid crystal display apparatus further includes a filter layer disposed on a surface of the lens layer proximate to the texture recognition layer or a surface of the lens layer away from the texture recognition layer. The filter layer is configured to filter light other than light emitted by the second light source.

BRIEF DESCRIPTION OF THE DRAWINGS

In order to describe technical solutions in embodiments of the present disclosure or the prior art more clearly, the accompanying drawings to be used in the description of the embodiments or the prior art will be introduced briefly. However, the accompanying drawings to be described below are merely some embodiments of the present disclosure, and for a person of ordinary skill in the art, other accompanying drawings can be obtained according to these accompanying drawings without creative efforts.

DETAILED DESCRIPTION

Technical solutions in some embodiments of the present disclosure will be described clearly and completely below with reference to the accompanying drawings. However, the described embodiments are merely some but not all embodiments of the present disclosure. All other embodiments obtained by a person of ordinary skill in the art based on embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed in an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials or characteristics may be included in any one or more embodiments or examples in any suitable manner.

Hereinafter, the terms "first" and "second" are only used for descriptive purposes, but are not to be construed as indicating or implying relative importance or implicitly indicating the number of indicated technical features. Thus, features defined with "first" and "second" may explicitly or implicitly include one or more of the features. In the description of the embodiments of the present disclosure, unless otherwise specified, the term "a plurality of/the plurality of" means two or more.

Some embodiments may be described using the expressions "coupled" and "connected" along with their derivatives For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact with each other. However, the term "coupled" or "communicatively coupled" may also mean that two or more components are not in direct contact with each other, but still cooperate or interact with each other. The embodiments disclosed herein are not necessarily limited to the content herein.

The phrase "at least one of A, B and C" has the same meaning as the phrase "at least one of A, B or C", and they both include the following combinations of A, B and C: only A, only B, only C, a combination of A and B, a combination of A and C, a combination of B and C, and a combination of A, B and C.

The phrase "A and/or B" includes the following three combinations: only A, only B, and a combination of A and B.

As used herein, the term "if" is optionally construed as "when" or "in a case where" or "in response to determining that" or "in response to detecting" depending on the context. Similarly, depending on the context, the phrase "if it is determined . . . " or "if [a stated condition or event] is detected" is optionally construed as "in a case where it is determined . . . " or "in response to determining . . . " or "in a case where [the stated condition or event] is detected" or "in response to detecting [the stated condition or event]".

The use of the phrase "applicable to" or "configured to" herein means an open and inclusive language, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As used herein, the term such as "about", "substantially" or "approximately" includes a stated value and an average value within an acceptable range of deviation of a particular value. The acceptable range of deviation is determined by a person of ordinary skill in the art in view of the measurement in question and the error associated with the measurement of a particular quantity (i.e., the limitations of the measurement system).

Exemplary embodiments are described herein with reference to sectional views and/or plan views as idealized exemplary drawings. In the drawings, thicknesses of layers and regions are enlarged for clarity. Therefore, variations in shape with respect to the accompanying drawings due to, for example, manufacturing techniques and/or tolerances may be envisaged. Therefore, the exemplary embodiments should not be construed as being limited to the shapes of the regions shown herein, but including shape deviations due to, for example, manufacturing. For example, an etched region shown as a rectangle generally has a feature of being curved. Therefore, the regions shown in the accompanying drawings are schematic in nature, and their shapes are not intended to show actual shapes of regions in a device, and are not intended to limit the scope of the exemplary embodiments.

Due to a large thickness of a liquid crystal display (LCD) and a limitation of light transmission properties of materials of the LCD, a light transmittance of the LCD is poor. If the fingerprint recognition technology is applied to the field of liquid crystal display, an intensity of light reaching a finger after passing through the LCD with a certain thickness has been reduced; and after irradiating a fingerprint, reflected light off the finger returns along an original path, and will be further diffused after passing through a diffusion sheet of a backlight module of the LCD. Consequently, an intensity of light received by a texture recognition layer (e.g., a fingerprint recognition layer) disposed on a side of the backlight module away from a display surface of the LCD is too low. This causes a quite high difficulty of fingerprint recognition, and a clear fingerprint cannot be obtained by recognizing, so a recognition effect is poor.

In order to solve this problem, in one aspect, some embodiments of the present disclosure provide a display apparatus. The display apparatus may be an electronic device having a display function. For example, the display apparatus may be one of: a displayer, a television, a billboard, a digital photo frame, a laser printer having a display function, a telephone, a mobile phone, a tablet computer, a personal digital assistant (PDA), a digital camera, a portable video camera, a viewfinder, a navigator, a vehicle-mounted computer, a splicing display apparatus, a home appliance, an information inquiry equipment (such as business inquiry equipment in e-government, banking, hospital, electric power department and other departments), a monitor, etc. Embodiments of the present disclosure do not make special limitations to uses of the above-mentioned display apparatus.

Figure 2A:
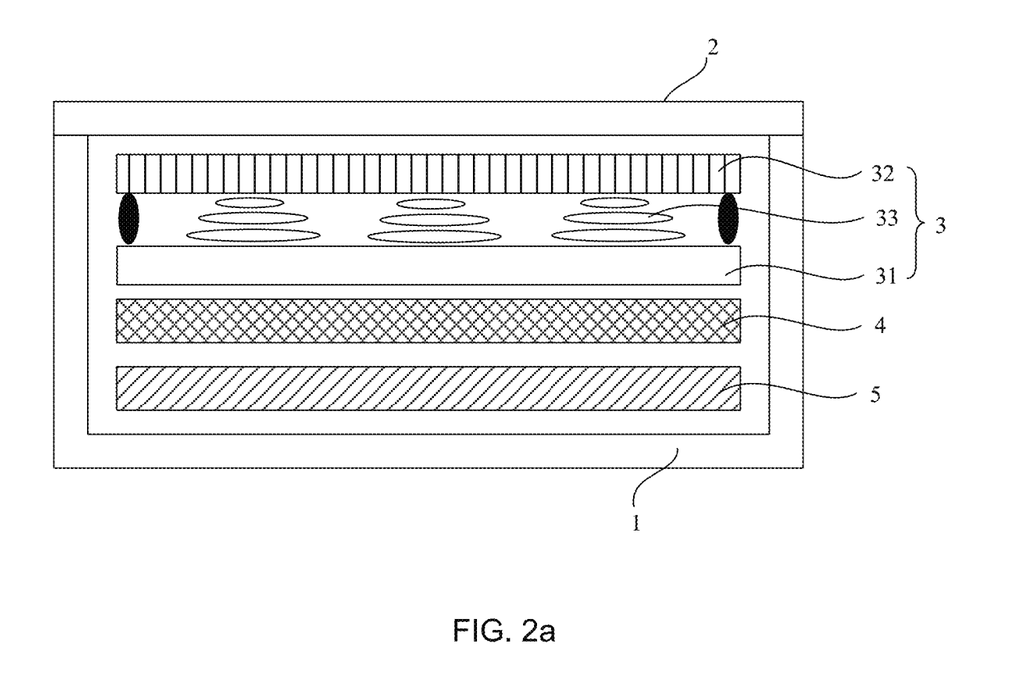
FIG. 2a is a structural diagram of a liquid crystal display apparatus, provided in embodiments of the present disclosure.
Figure 3A:
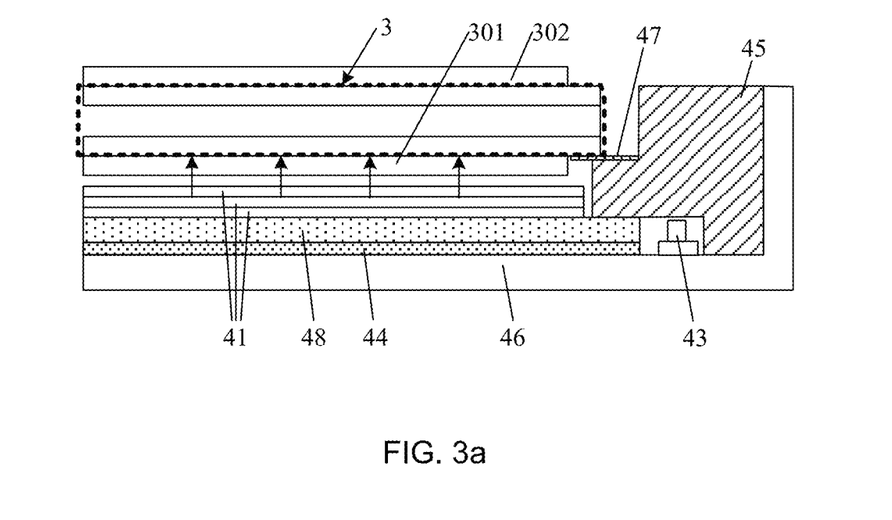
FIG. 3a is a structural diagram of still another liquid crystal display apparatus, provided in embodiments of the present disclosure.
Figure 3B:
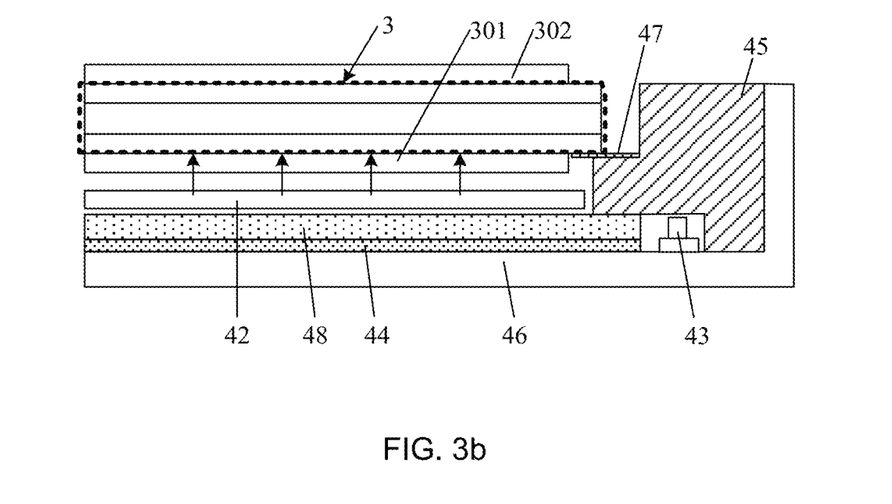
FIG. 3b is a structural diagram of still another liquid crystal display apparatus, provided in embodiments of the present disclosure.

For example, the display apparatus may be a LCD apparatus. As shown in FIGS. 2a, 3a and 3b, the LCD apparatus includes a frame 1, a cover glass 2, a LCD panel 3, a lower polarizer 301, an upper polarizer 302, a backlight module 4, a circuit board 5 and other electronic accessories including a camera.

A longitudinal section of the frame 1 is U-shaped. The LCD panel 3, the lower polarizer 301, the upper polarizer 302, the backlight module 4, the circuit board 5 and the other electronic components are disposed in the frame 1. The backlight module 4 is disposed below the LCD panel 3. The lower polarizer 301 is disposed between the LCD panel 3 and the backlight module 4. The circuit board 5 is disposed below the backlight module 4. The cover glass 2 is located on a side of the LCD panel 3 away from the backlight module 4. The upper polarizer 302 is disposed between the LCD panel 3 and the cover glass 2.

As shown in FIG. 2a, the LCD panel 3 includes an array substrate 31, an opposite substrate 32 and a liquid crystal layer 33 disposed between the array substrate 31 and the opposite substrate 32. The array substrate 31 and the opposite substrate 32 are assembled together by a frame sealant, so that the liquid crystal layer 33 is confined to a region enclosed by the frame sealant.

The backlight module 4 may be a side-type backlight module. As shown in FIG. 3a or 3b, the side-type backlight module 4 includes a back plate 46, a plastic frame 45, a light guide plate 48 disposed on the back plate 46, at least one optical sheet 41 disposed on a light exit side of the light guide plate 48, and first light source(s) 43 disposed on at least one side of the light guide plate 48 (e.g., one side or two opposite sides). In addition, the side-type backlight module 4 may further include a reflective sheet 44 disposed between the back plate 46 and the light guide plate 48.

The LCD panel 3 may be fixed with the plastic frame 45 by a black double sided tape 47. The first light source may be, for example, a light-emitting diode (LED).

Figure 2B:
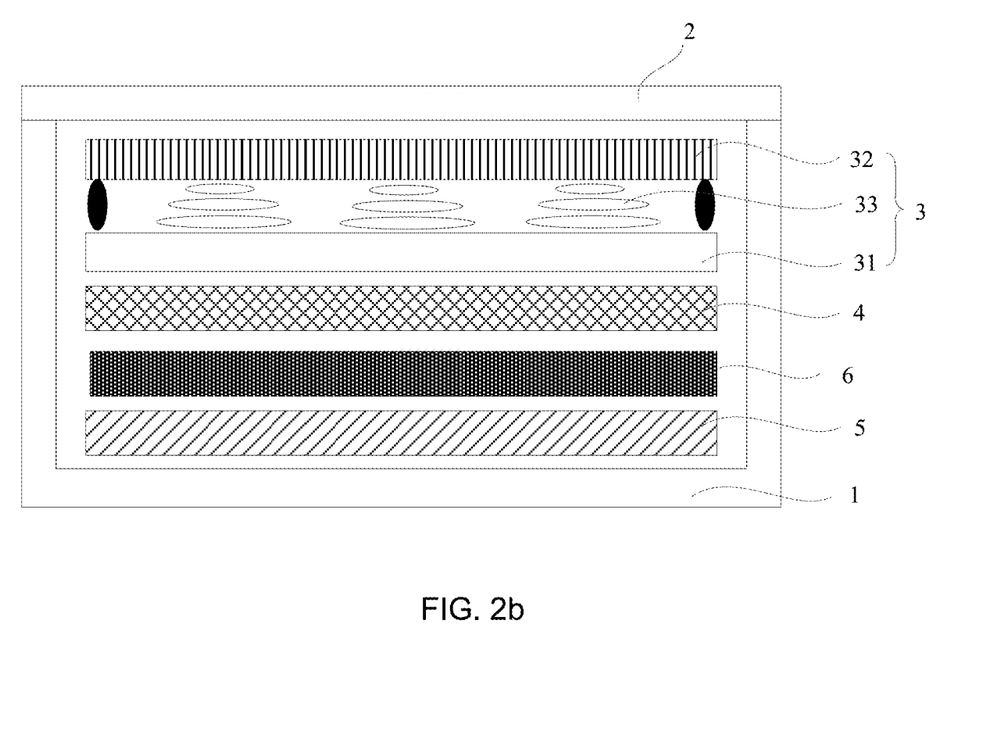
FIG. 2b is a structural diagram of another liquid crystal display apparatus, provided in embodiments of the present disclosure.

On this basis, with reference to FIG. 2b, the LCD apparatus may further include a texture recognition device 6. The texture recognition device 6 may be disposed on a side of the side-type backlight module away from the LCD panel 3. The texture recognition device 6 may include a texture recognition layer. In this way, the LCD apparatus may also perform texture recognition, which improves safety of use. Texture recognition may include at least one of fingerprint recognition and palmprint recognition.

Figure 4:
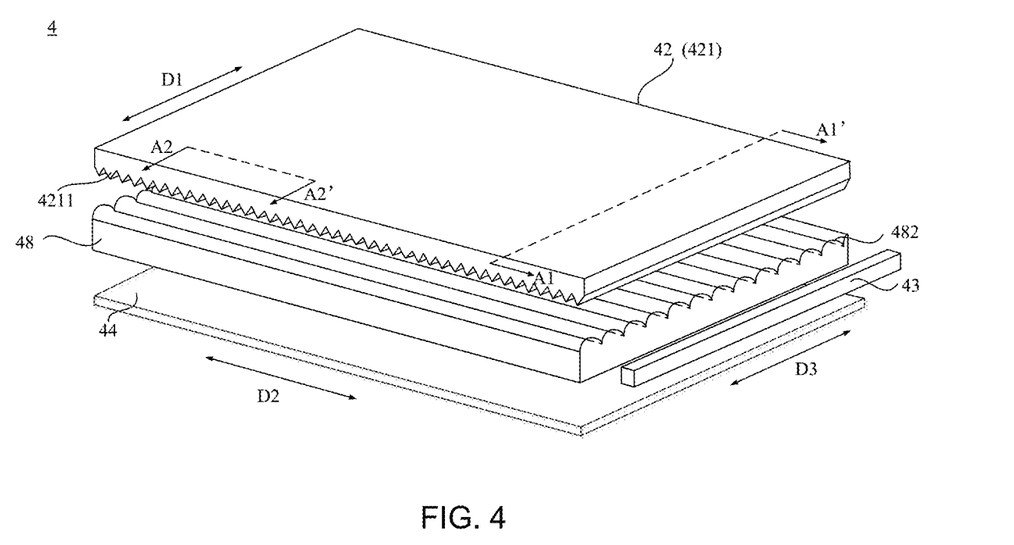
FIG. 4 is a structural diagram of a side-type backlight module, provided in embodiments of the present disclosure.

In another aspect, embodiments of the present disclosure provide a side-type backlight module, which may be used as the backlight module of the LCD apparatus. As shown in FIG. 4, the side-type backlight module 4 may include a reverse prism sheet 42, at least one first light source 43, a reflective sheet 44 and a light guide plate 48. The side-type backlight module 4 will be described in detail in conjunction with specific embodiments below.

For example, with reference to FIG. 4, the side-type backlight module 4 may include one first light source 43 disposed on a side of the light guide plate 48. The first light source 43 may be a light bar such as a light-emitting diode (LED) light bar, or may be a luminous body capable of emitting light with high brightness, which is not limited. The first light source 43 is disposed on the side of the light guide plate 48, so that light emitted by the first light source 43 may be irradiated to a light incident surface of the light guide plate 48 (i.e., a side face of the light guide plate 48). For example, the first light source 43 faces the light incident surface of the light guide plate 48. That is, in a direction perpendicular to the light incident surface of the light guide plate 48, an orthographic projection of the first light source 43 on a plane where the light incident surface of the light guide plate 48 is located and the light incident surface of the light guide plate 48 have an overlapping region. For another example, the side-type backlight module may include two first light sources disposed on two opposite sides of the light guide plate, respectively. In this way, brightness uniformity of the entire backlight module may be improved.

With continued reference to FIG. 4, the reflective sheet 44 is disposed on a surface of the light guide plate 48 away from the reverse prism sheet 42. The reflective sheet 44 is a film or a layer capable of reflecting light, which is well known to those skilled in the art, and will not be detailed here.

Figure 5A:
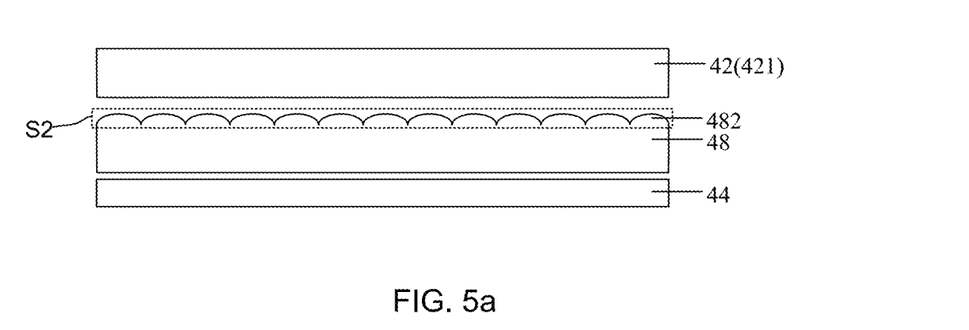
FIG. 5a is a sectional view of the side-type backlight module along a direction A1-A1' in FIG. 4.
Figure 5B:
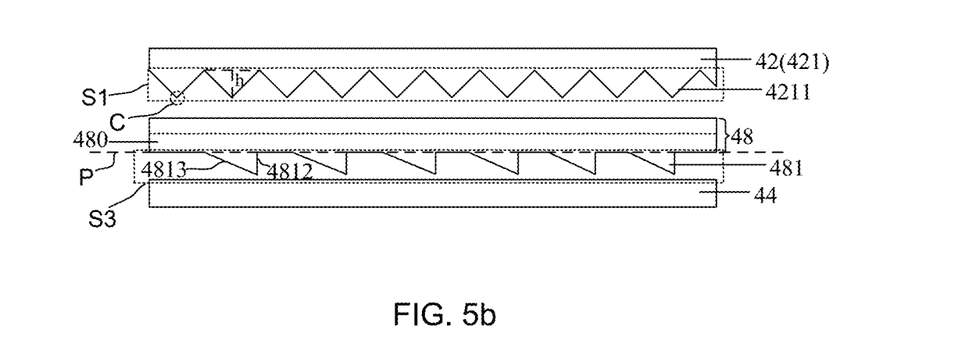
FIG. 5b is another sectional view of the side-type backlight module along the direction A2-A2' in FIG. 4.

With reference to FIGS. 4 and 5*b*, the reverse prism sheet 42 includes a first prism 421. A surface S1 of the first prism 421 proximate to the light guide plate 48 includes a plurality of prism structures 4211 substantially parallel to each other. Each prism structure 4211 protrudes toward a direction approaching the light guide plate 48, and an extending direction D1 of each prism structure 4211 is the same as an extending to direction D3 of the first light source 43. The plurality of prism structures 4211 being substantially parallel to each other means that, extending directions D1 of the plurality of prism structures 4211 are parallel to each other, alternatively, an included angle between extending directions D1 of any two prism structures 4211 among the plurality of prism structures 4211 does not exceed 5 degrees. For example, the plurality of prism structures 4211 may be continuously distributed. For example, every two adjacent prism structures 4211 among the plurality of prism structures 4211 may be in directly contact. For another example, every two adjacent prism structures 4211 among the plurality of prism structures 4211 are not in contact, and no other microstructures protruding toward the light guide plate 48 are provided therebetween. For example, with reference to FIG. 5*b*, the plurality of prism structures 4211 extend in a direction perpendicular to a paper on which FIG. 4 is drawn, and the prism structures 4211 in a lower surface (i.e., the surface S1 facing the light guide plate 48) of the first prism 421 of the reverse prism sheet 42 are in a shape of a continuous zigzag. For example, a material of the first prism 421 may be an adhesive, such as an ultraviolet curing adhesive (also referred to as a shadowless adhesive, a UV adhesive, a photosensitive adhesive, etc.).

With continued reference to FIGS. 4 and 5*a*, a surface S2 of the light guide plate 48 proximate to the reverse prism sheet 42 includes a plurality of strip-shaped microstructures 482 substantially parallel to each other. The strip-shaped microstructures 482 protrude toward a direction approaching the reverse prism sheet 42. The plurality of strip-shaped microstructures 482 are arranged substantially in parallel, which means that, extending directions of the plurality of strip-shaped microstructures 482 are parallel to each other, alternatively, an included angle between extending directions of any two strip-shaped microstructures of the plurality of strip-shaped microstructures does not exceed 5 degrees. For example, the plurality of strip-shaped microstructures may be continuously distributed. For example, every two adjacent strip-shaped microstructures among the plurality of strip-shaped microstructures may be in direct contact. For another example, every two adjacent strip-shaped microstructures among the plurality of strip-shaped microstructures are not in direct contact, and no other microstructures protruding toward a direction facing the reverse prism sheet 42 are provided therebetween.

With reference to FIG. 4, an extending direction D1 of a single prism structure 4211 crosses an extending D2 direction of a single strip-shaped microstructure 482. For example, an extending direction D1 of an orthographic projection of each prism structure 4211 of the plurality of prism structures 4211 on the light guide plate 48 crosses an extending direction D2 of any one of the strip-shaped microstructures 482 of the light guide plate 48.

An included angle between the extending direction of the strip-shaped microstructure 482 and the extending direction of the prism structure 4211 may be any value greater than 0 degrees and less than 180 degrees, which is not overly limited. For example, with reference to FIG. 5*a*, the strip-shaped microstructures 482 extend in a direction perpendicular to the paper. In this case, the prism structures 4211 may extend in a direction parallel to the paper, and extending directions of the strip-shaped microstructures 482 are perpendicular to extending directions of the prism structures 4211. The extending directions of the strip microstructures 482 are different from the extending directions of the prism structures 4211, so that after light irradiated by the first light source 43 to the light guide plate 48 is refracted and reflected by the structures with different extending directions, a good light diffusion effect may be achieve. As a result, distribution of light emitted from a light exit surface of the side-type backlight module is quite uniform, which realizes a good light-exit effect.

When the reverse prism sheet 42 is attached to an upper surface (i.e., the surface S2 of the light guide plate 48 provided with the strip-shaped microstructures 482 therein) of the light guide plate 48, since an existence of the strip-shaped microstructures 482 can play a role in supporting the reverse prism sheet 42, there is a certain gap existing between the upper surface of the light guide plate 48 and the reverse prism sheet 42. Therefore, the reverse prism sheet 42 is effectively prevented from being appressed with the upper surface of the light guide plate 48, thereby avoiding uneven light-exit brightness of the display apparatus. In addition, since the upper surface is the light exit side of the light guide plate 48, an arrangement of the strip-shaped microstructures 482 may play a certain role in concentrating light. Therefore, on the basis of preventing the inverted prism sheet 42 from being appressed with the upper surface of the light guide plate 48, light-exit brightness of the backlight module is further improved.

For example, in the side-type backlight module, on a side of the light guide plate away from the reflective sheet, it may be possible to provide only the reverse prism sheet (which may be used as a kind of optical film), while no other optical films are provided. In this way, a number of optical films in the side-type backlight module is reduced, which may be conductive to reducing a total thickness under a premise of ensuring light-exit performances of the side-type backlight module. In addition, since there is no need to provide other optical films such as a diffusion sheet, in a case where the side-type backlight module is applied to a LCD apparatus having a fingerprint recognition function, it may be possible to avoid an interference when light reflected by a finger passes through other optical films, which is conducive to accuracy of fingerprint recognition.

For another example, in the side-type backlight module, at least one other optical film may be provided on a side of the reverse prism sheet away from the light guide plate.

The reverse prism sheet 42 above is a brightness enhancement film with a prism surface face down, which can turn a direction of light emitted from the light guide plate into a vertical direction through total reflection. Therefore, a light-exit angle may be narrowed, and the light-exit brightness of the side-type backlight module is improved.

For example, embodiments of the present disclosure do not limit specific shapes of the prism structures 4211 included in the first prism 421, as long as the prism structures 4211 may serve to adjust an angle of the light exiting the light guide plate 48. With reference to FIG. 5b, the prism structure 4211 may be a triangular prism. In a case where the prism structure 4211 is a triangular prism, for example, with reference to FIG. 5b, the prism structure 4211 has a protruding corner C protruding toward a direction approaching the light guide plate 48, and a section of the protruding corner C taken along a direction perpendicular to the extending direction D1 of the prism structure 4211 has two edges connected to each other. An include angle between the two edges is within a range of 56 degrees to 75 degrees, inclusive. A height h of the prism structure 4211 is within a range of is 10 μm to 25 μm, inclusive. For example, the angle between the two edges is 68 degrees. Such an angle value is easily achieved under common process conditions, which is conductive to reducing production costs. Moreover, the moderate angle may prevent protruding corners C of the prism structures 4211 protruding toward the direction approaching the light guide plate 48 from being damaged, and reliability of the prism structures 4211 is high.

Figure 6A:
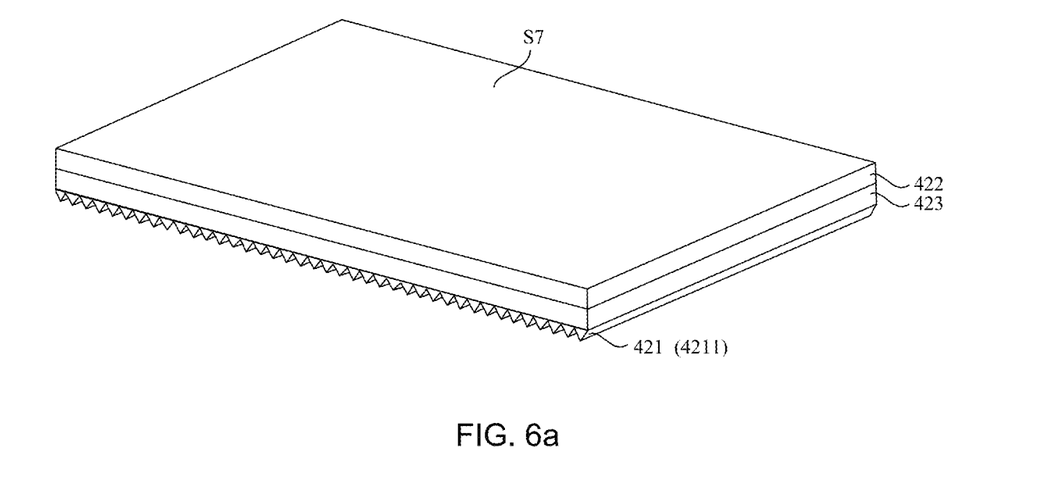
FIG. 6a is a structural diagram of an reverse prism sheet, provided in embodiments of the present disclosure.
Figure 6B:
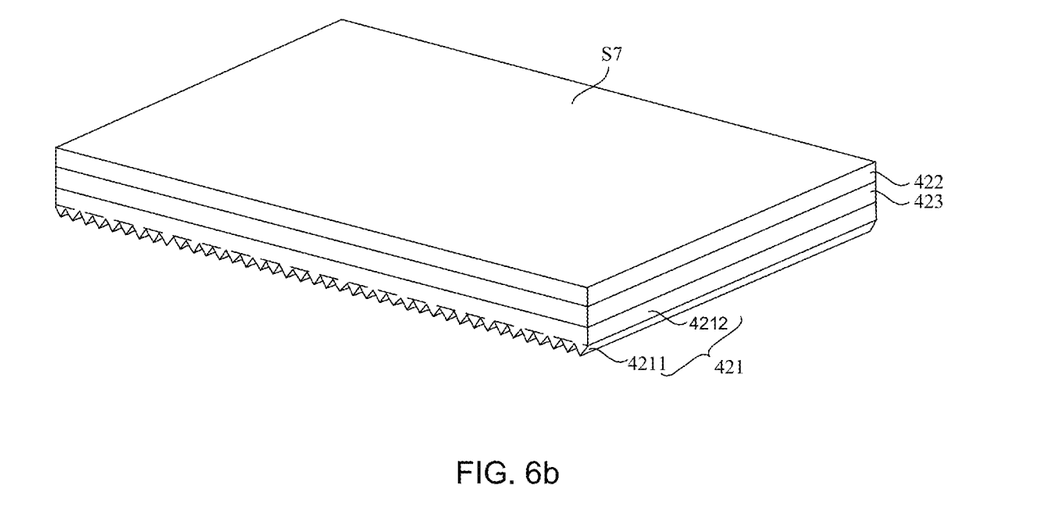
FIG. 6b is a structural diagram of another reverse prism sheet, provided in embodiments of the present disclosure.

It will be noted that, with reference to FIG. 6a, the first prism 421 may only include the plurality of prism structures 4211; and with reference to FIG. 6b, the first prism 421 may further include a bearing portion 4212 located on a side of the plurality of prism structures 4211 away from the light guide plate. The plurality of prism structures 4211 and the bearing portion 4212 are made of a same material, and are of an integrated structure.

Figure 7:
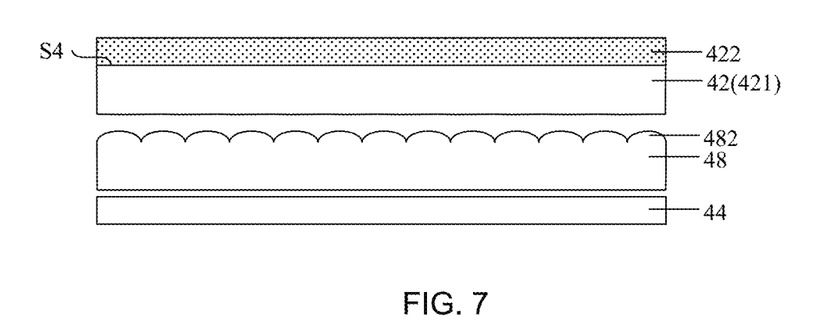
FIG. 7 is a structural diagram of another side-type backlight module, provided in embodiments of the present disclosure.

In some embodiments, as shown in FIG. 7, the reverse prism sheet 42 further includes a second prism or an optical film 422 disposed on a surface S4 of the first prism 421 away from the light guide plate 48. The second prism or the optical film 422 is obtained by haze treatment. By changing a doping concentration and a thickness of the second prism or the optical film 422, a haze of the second prism or the optical film 422 may be changed. In a case where the prism sheet 42 includes the optical film layer 422, the optical film layer 422 may be provided without prism structures thereon. For example, a surface of the optical film 422 proximate to the first prism 421 may be a flat surface, and a surface S7 of the optical film 422 away from the first prism 421 may be haze-treated.

In the case where the side-type backlight module is applied to the LCD apparatus, by adjusting the haze of the second prism or the optical film 422, display effects of the LCD apparatus may be adjusted, so as to avoid a phenomenon of light leakage (hotspot). On this basis, if the LCD apparatus further has a texture recognition function, it may also be possible to adjust the display effects and the texture recognition accuracy of the LCD apparatus by adjusting the haze of the second prism or the optical film 422.

The greater the haze, the greater an influence on light reflected by a finger, and then the lower the texture recognition accuracy. The smaller the haze, the greater an influence on light emitted from the side-type backlight module to the LCD panel 3, which may cause light leakage on a light-exit surface, and then affect the display effects of the LCD apparatus. Based on these, an accurate haze range may be set in the following manners. For example, the thickness of the second prism or the optical film 422 may be within a range of 3 μm to 13 μm, inclusive. Such a design enables the side-type backlight module to avoid the light leakage (hotspot) phenomenon as well as have a high texture recognition accuracy. In a case where the doping concentration is constant, the thickness of the second prism or the optical film 422 may be within a range of 5 μm to 7 μm, inclusive. For example, a material of the second prism or the optical film 422 may be an adhesive, such as an ultraviolet curing adhesive (also known as a shadowless adhesive, UV adhesive, or photosensitive adhesive), which is formed on an upper surface of the first prism 421 (a surface proximate to the second prism or the optical film 422).

A thickness of a reflective sheet in the related art is usually 0.5 mm, while a thickness of a second prism 422 is only 5 μm to 7 μm. In contrast, the thickness of the reflective sheet is much greater than the thickness of the second prism 422. Therefore, although the second prism 422 is added, a total thickness of the side-type backlight module will almost be unaffected, and moreover the light leakage (hotspot) phenomenon may be prevented from occurring in the side-type backlight module, which improves the light-exit effects of the side-type backlight module as well as achieves a high texture recognition accuracy.

In some embodiments, with reference to FIGS. 6a and 6b, the reverse prism sheet 42 may further include a second substrate 423 between the first prism 421 and the second prism 422. For example, a material of the second substrate 423 may be polycarbonate (PC) or general purposed plastics, such as polyvinyl chloride or polystyrene. A thickness of the second substrate 423 may within a range of 50 μm to 150 μm, inclusive. In a case where the material of the first prism 421, the material of the second substrate 423 and the material of the second prism or the optical film 422 are the same, it may be possible to integrally form the reverse prism sheet 42 by a process such as injection molding. In a case where the material of the first prism 421 and the material of the second prism or the optical film 422 are UV adhesives, the first prism 421 and the second prism or the optical film 422 may be formed on the second substrate 423 through coating, exposure and development, so as to form the reverse prism sheet 42 that is inseparable.

Embodiments of the present disclosure do not limit specific structures of the strip-shaped microstructures 482 of the light guide plate 48. A material of the strip-shaped microstructures 482 may be polycarbonate. For example, with reference to FIG. 5a, in a thickness direction of the light guide plate 48, the strip-shaped microstructure 482 may be an arched structure, and a top portion of the arched structure is toward the direction approaching the reverse prism sheet 42. That is, a cross-section thereof may be a fan-shape, a semi-circle (i.e., a portion of a circle, which may be half or less than half of the circle), a semi-ellipse (i.e., a portion of an ellipse, which may be half or less than half of the ellipse), or a parabola-shape (i.e., an axisymmetric shape surrounded by a parabola and a straight line segment). The cross-section of the strip-shaped microstructure 482 may also be a triangle, a trapezoid, or a triangle with a circular arc at a vertex angle.

Figure 8:
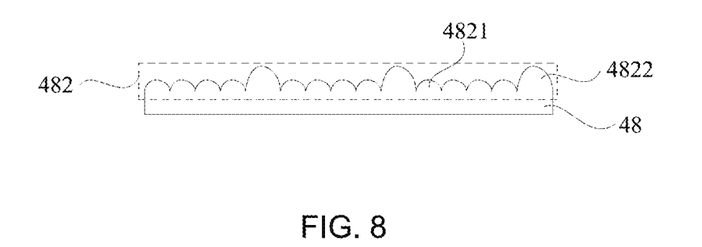
FIG. 8 is a sectional view of a light guide plate, provided in embodiments of the present disclosure.

For example, a thickness of the strip-shaped microstructure 482 is within a range of 0.5 μm to 1.9 μm, inclusive. For example, with reference to FIG. 8, cross-sections of the plurality strip-shaped microstructures 482 in the thickness direction of the light guide plate 48 may be semicircles or semi-ellipses, and the strip-shaped microstructures 482 include first strip-shaped microstructures 4821 with a small height and second strip-shaped microstructures 4822 with a large height. A plurality of first strip-shaped microstructures 4821 (e.g., four first strip-shaped microstructures 4821) and at least one second strip-shaped microstructure 4822 (e.g., one second strip-shaped microstructure 4822) are arranged in cycles in the upper surface (i.e., the surface of the light guide plate provided with the strip-shaped microstructures 482 therein) of the light guide plate 48.

For example, with reference to FIG. 5*b*, a surface S3 of the light guide plate 48 away from the reverse prism sheet 42 includes a plurality of wedge-shaped structures 481 arranged at intervals. A material of the wedge-shaped structures 481 may be polycarbonate. The wedge-shaped structures 481 may diffuse light entering the light guide plate 48, and break an internal propagation caused by total reflection, so that the light is distributed evenly, and then exits from the light exit surface of the backlight module. The wedge-shaped structures 481 may be arranged in an array, or may not be arranged in an array but only distributed in a plurality of rows and a plurality of columns. Alternatively, there are also other arrangement manners, which is not overly limited. As shown in FIG. 5*b*, a plane P in which a flat portion, without the plurality of wedge-shaped structures 481, of the surface S3 of the light guide plate 48 is located is a reference plane P. A wedge-shaped structure 481 of the plurality of wedge-shaped structures 481 includes a first inclined surface 4812 forming a first angle with the reference plane P and a second inclined surface 4813 forming a second angle with the reference plane P. The first angle and the second angle are both an acute angle, and the first angle is greater than the second angle.

Figure 9:
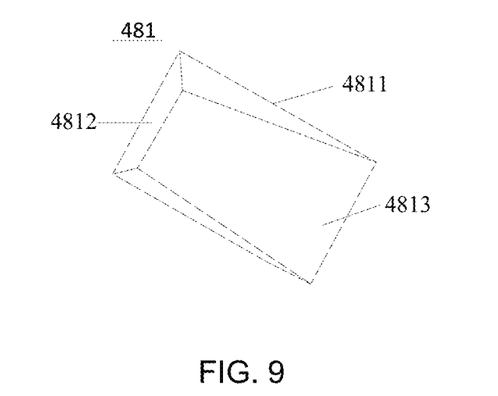
FIG. 9 is a structural diagram of a wedge-shaped structure, provided in embodiments of the present disclosure.

For example, with reference to FIGS. 5*b* and 9, the wedge-shaped structure 481 includes a bottom surface 4811 parallel to the reference surface P, the first inclined surface 4812 forming the first angle with the bottom surface, and the second inclined surface 4813 forming the second angle with the bottom surface. The second angle is within a range of 1 degree to 5 degrees, inclusive. The first angle may be 67 degrees, the second angle may be 3 degrees, and an included angle between the first inclined surface 4812 and the second inclined surface 4813 is 110 degrees. A size of the bottom surface 4811 may be 45 μm×50 μm, and a thickness of the wedge-shaped structure 481 is not greater than 2.5 μm. Such an angle requirement may achieve a good light diffusion effect, and moreover be easy to be satisfied under common process conditions, which is conducive to a control of production costs.

For example, a distribution density of wedge-shaped structures of the light guide plate at a position proximate to the first light source is less than a distribution density of wedge-shaped structures of the light guide plate at a position away from the first light source. For example, the distribution density of the wedge structures of the light guide plate at the position proximate to the light guide plate is low, and the distribution density of the wedge structures of the light guide plate at the position away from the first light source is high, so that a light-exit brightness at the position away from the first light source is basically the same as a light-exit brightness at the position proximate to the light guide plate, which is conducive to improving light-exit uniformity of the backlight module.

In some embodiments, with reference to FIG. 5*b*, the light guide plate 48 may further include a first substrate 480 disposed between the wedge-shaped structures 481 and the strip-shaped microstructures 482. The first substrate 480 is in a shape of a flat plate. A thickness of the first substrate 480 may be within a range of 78 μm to 380 μm, inclusive. For example, a material of the first substrate 480 may be polycarbonate (PC) or general purposed plastics, such as polyvinyl chloride, polystyrene, etc. The light guide plate 48 including the plurality of wedge-shaped structures 481, the plurality of strip-shaped microstructures 482 and the first substrate 480 may be an integrally formed light guide plate 48, and the light guide plate 48 may be formed by a process such as injection molding.

The side-type backlight module provided in embodiments of the present disclosure includes the first light source 43, the reflective sheet 44, the light guide plate 48 and the reverse prism sheet 42. After passing through the wedge-shaped structures 481 and the strip-shaped microstructures 482 of the light guide plate 48 and the first prism 421 of the first reverse prism sheet 42, display light emitted by the first light source 43 exits from the side-type backlight module in various directions. In the case where the side-type backlight module is applied to a LCD apparatus, the display light exiting in various directions may enter the LCD panel 3, thereby realizing display. In this process, a function of diffusing display light may be realized in the embodiments of the present disclosure by providing only the reflective sheet 44, the light guide plate 48 and the reverse prism sheet 42, while there is no need to provide a three-layer structure of an upper diffusion sheet, a prism sheet and a lower diffusion sheet that are stacked in sequence. Therefore, the single reverse prism sheet is used to replace a combination of the diffusion sheets and the prism with the three-layer structure, which reduces a thickness of the side-type backlight module.

On this basis, for the LCD apparatus having a texture recognition function, since the single reverse prism sheet 42 is used to replace the combined structure of the diffusion sheets and the prism, a total thickness of the side-type backlight module is reduced. Even though light reflected by a finger may still be diffused, as the thickness of the side-type backlight module decreases, a diffusion degree of the reflected light by the side-type backlight module decreases, and a diffusion range of the reflected light becomes narrow. Therefore, it is conducive to improving the texture recognition accuracy.

Figure 10:
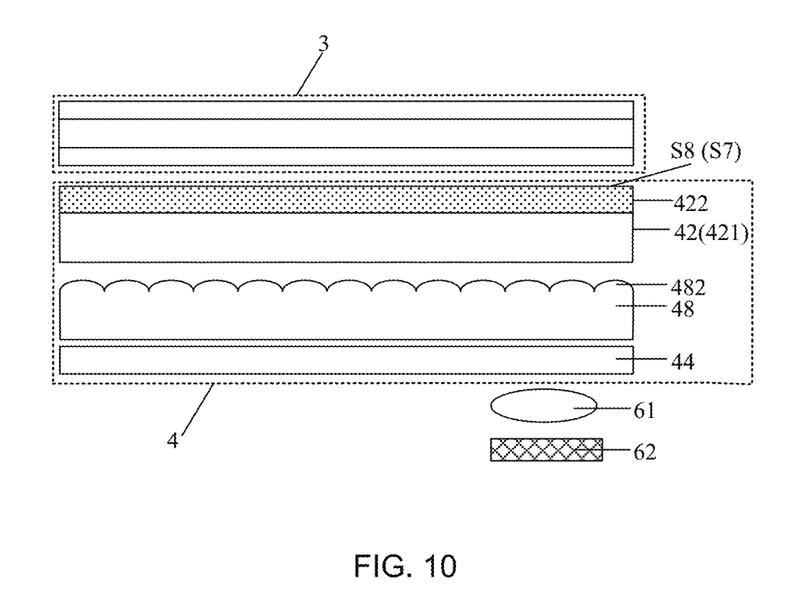
FIG. 10 is a structural diagram of still another liquid crystal display apparatus, provided in embodiments of the present disclosure.

In some embodiments of the present disclosure, the LCD apparatus may be used to detect objects with textures such as fingerprints and palm prints, which are not particularly limited in embodiments of the present disclosure. As shown in FIG. 10, in addition to the side-type backlight module described in any one of the above embodiments, the LCD apparatus further includes the LCD panel 3 disposed on a light exit side of the side-type backlight module, and a texture recognition layer 62 on a surface S8 of the side-type backlight module away from the LCD panel 3.

For example, a region where the texture recognition layer 62 is located is a texture recognition region. An area of the texture recognition region may be less than or equal to an area of an active area of the LCD apparatus, which is not limited. For example, the area of the texture recognition region is less than the area of the active area of the LCD apparatus, and the texture recognition region is located at a specific position of the active area of the LCD apparatus.

A principle of texture recognition is that: after being irradiated to a finger, light emitted from the LCD apparatus is reflected by the finger, and the light reflected by the finger is then irradiated on the texture recognition layer 62.

The texture of the finger includes valleys and ridges, and intensities of display light reflected by a valley and by a ridge are different. After receiving light reflected by the valleys and the ridges, the texture recognition layer 62 converts optical signals into electrical signals. A texture recognition circuit of the LCD apparatus forms a texture image according to the electrical signals, and makes a comparison with pre-stored texture information, so as to complete texture recognition.

Embodiments of the present disclosure provide the LCD apparatus including the side-type backlight module in the above embodiments. The side-type backlight module includes the first light source 43, the reflective sheet 44, the light guide plate 48 and the reverse prism sheet 42. After passing through the wedge-shaped structures 481 and the strip-shaped microstructures 482 of the light guide plate 48 and the first prism 421 of the first reverse prism sheet 42, the display light emitted by the first light source 43 exits from the side-type backlight module in various directions. In the case where the side-type backlight module is applied to the LCD apparatus, the display light exiting in various directions may enter the LCD panel 3, thereby realizing display. In this process, the reflective sheet 44, the light guide plate 48, and the reverse prism sheet 42 in the embodiments of the present disclosure may play a role in diffusing the display light. By using the reverse prism sheet 42 with a small thickness to replace diffusion sheets with a large thickness, a thickness of the side-type backlight module is reduced. On this basis, for the LCD apparatus with the texture recognition function, due to a reduction in the total thickness of the side-type backlight module, even if light reflected by a finger may still be diffused, as the thickness of the side-type backlight module decreases, compared with the prior art, a diffusion range of the reflected light is narrowed, which is conducive to improving the texture recognition accuracy.

In some embodiments, with reference to FIG. 10, the LCD apparatus further includes a lens layer 61. The lens layer 61 is disposed between the texture recognition layer 62 and the side-type backlight module. For example, a specific structure of the lens layer 61 is not limited, as long as the lens layer 61 may play a role in concentrating light, so as to achieve an effect of improving the texture recognition accuracy and reducing a size of the texture recognition layer 62.

For example, the lens layer 61 is a single lens or a lens group.

For example, the lens layer 61 is the lens group. A structure of the lens group may be a lens group with imaging parameters similar to a single lens, which has an ability of macro imaging. The lens group may be a four-piece lens group.

Figure 11:
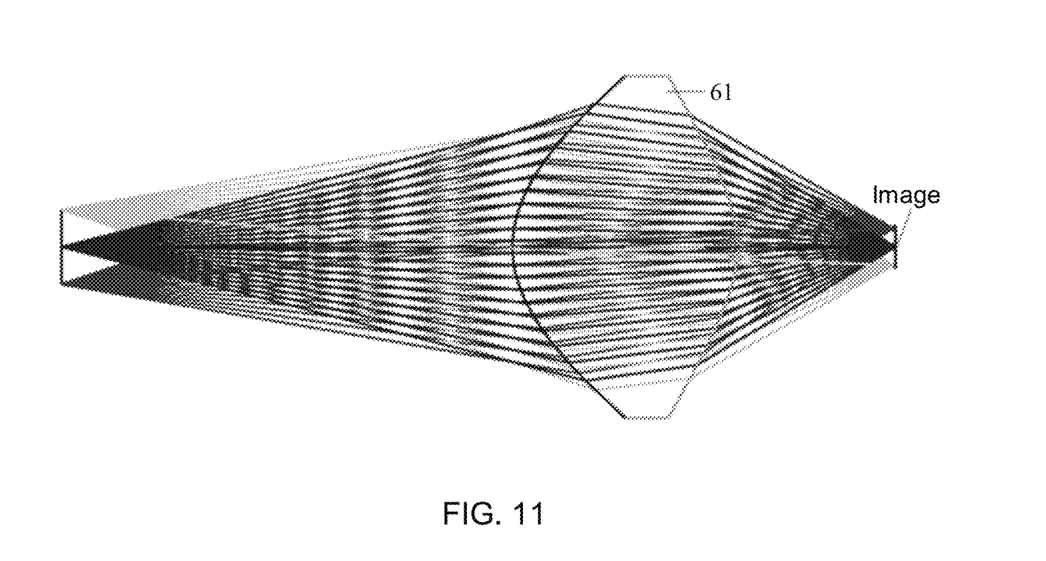
FIG. 11 is a light path diagram of reflected light passing through a lens layer, provided in embodiments of the present disclosure.

For example, the lens layer 61 is the single lens, and the single lens may be a lens with a front radius and a back radius of 1.050 mm and minus 1.134 mm (−1.134 mm), respectively. For another example, the single lens may be an aspheric single lens. Alternatively, an aspheric surface of the single lens may be one of a quadric surface, an even-order aspheric surface, and a free-form surface. Coefficients such as the front radius, the back radius and a cone factor may be determined according to an object distance and an image distance, so as to realize texture recognition. A spherical lens is prone to aberrations, which affects light-concentrating effects of the lens layer 61. Therefore, the aspheric single lens may be selected as the lens layer 61, which may solve an aberrations problem, and improve the texture recognition accuracy. For example, with reference to FIG. 11, the aspheric single lens 61 is an even-order aspheric single lens. Radii of curvature of lens vertices are 0.839 mm and minus 4.568 mm (−4.568 mm), and a thickness of the lens is 2 mm.

Figure 12:
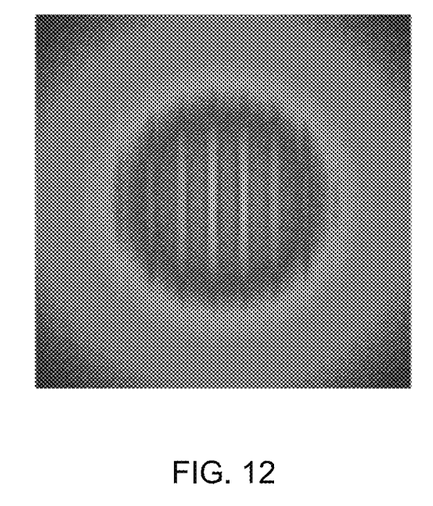
FIG. 12 is a graph showing a fingerprint simulation test result of a side-type backlight module, provided in embodiments of the present disclosure.

Due to the light-concentrating effects of the lens layer 61, the light reflected by a finger is concentrated by the lens when reaching the lens layer 61 through the side-type backlight module, which enables more light to be irradiated on the texture recognition layer 62. Thus, the electrical signals obtained after conversion by the texture recognition layer 62 are enhanced, and the texture image formed by the texture recognition circuit according to the electrical signals is more clearly. Therefore, it may be possible to achieve better texture recognition effects, and may be conductive to reducing a size of the texture recognition layer 62 and optimizing production costs. With reference to the fingerprint simulation test result diagram of FIG. 12, it will be seen that an arrangement of the lens layer 61 facilitates recognizing a fingerprint pattern with clear lines and obvious contrast, which significantly improves recognition effects.

In addition, a thickness of the single lens is about 2 mm. By using the single lens as the lens layer 61, it is conductive to thinning and lightening the LCD apparatus with the texture recognition function. Because only the single lens is used, a reflection loss on a working surface of the lens is small. Therefore, a process of coating a surface of the lens with an anti-reflection film may be omitted. An application of the single lens with a small thickness, small physical sizes, few fabricating processes and less difficulty in assembly greatly reduces manufacturing costs of the lens layer 61. In addition, since there is no need to provide an anti-reflection film, reliability of the lens layer 61 is also improved to a certain extent, which reduces a risk of failure.

Figure 13:
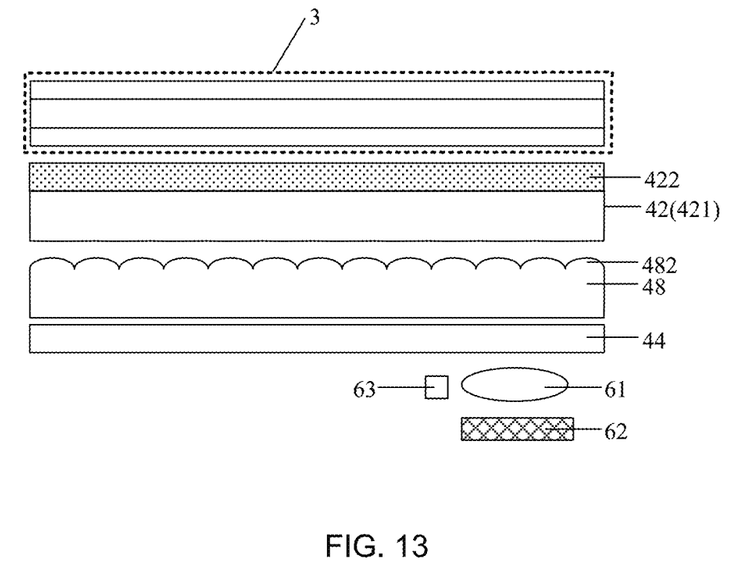
FIG. 13 is a structural diagram of still another liquid crystal display apparatus, provided in embodiments of the present disclosure.
Figure 14:
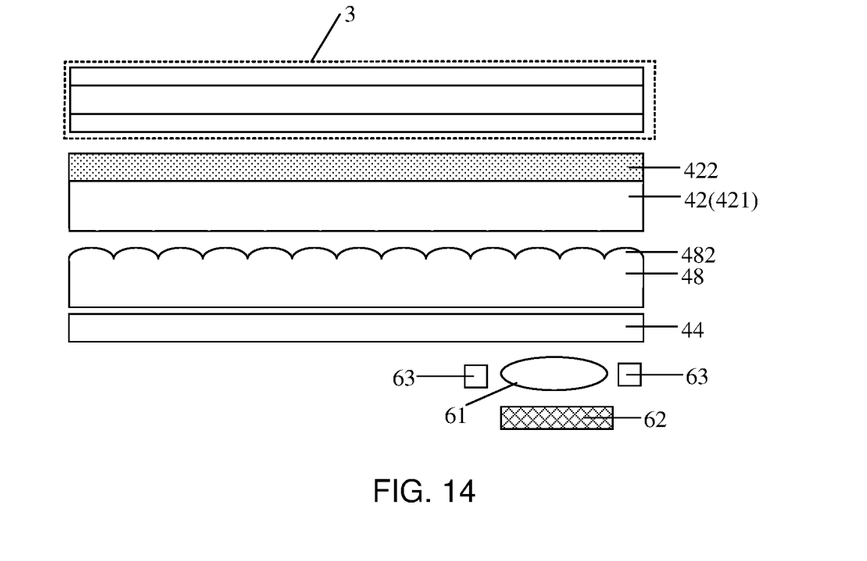
FIG. 14 is a structural diagram of still another liquid crystal display apparatus, provided in embodiments of the present disclosure.

For example, the LCD apparatus further includes second light source(s) 63 disposed on at least one side of the lens layer 61. The second light source(s) 63 can emit invisible light. For example, with reference to FIG. 13, a second light source 63 is disposed on a side of the lens layer 61. For another example, with reference to FIG. 14, second light sources 63 are arranged on both sides of the lens layer 61. Light emitted by the second light source(s) 63 may be ultraviolet light, infrared light, near-infrared light, etc., which is not limited. Light used for texture recognition may be the display light emitted by the first light source 43, or the light emitted by the second light source(s) 63, or both the two.

In some embodiments, a location of the second light source 63(s) is not limited, as long as the light thereof can exit from the LCD apparatus and be reflected onto the texture recognition layer 62 by a finger. For example, the second light source(s) 63 may be disposed on at least one side of the lens layer 61; alternatively, two second light sources 63 may be provided, and located on both sides of the lens layer 61, respectively.

Both the light emitted by the first light source 43 and the second light source(s) 63 can exit from the light exit surface of the LCD apparatus. The first light source 43 as a light source of the side-type backlight module is used to realize a display function of the LCD apparatus. The light emitted by the second light source(s) 63 is invisible light, which may avoid an interference with a realization of the display function of the LCD apparatus. In a case where the light used for texture recognition includes the light emitted by the second light source(s) 63, since materials of film layers in the side-type backlight module have a high transmittance to invisible light, an amount of invisible light reflected by a finger is correspondingly large, and the electrical signals obtained after conversion by the texture recognition layer 62 is strong. Therefore, it may be possible to achieve a good texture recognition effect.

The invisible light emitted by the second light source(s) 63 may be the infrared light or near-infrared light. Since infrared light and near-infrared light are not harmful to human eyes, by using a light source emitting infrared light or near-infrared light as the second light source(s) 63, it may be possible to improve users' experience.

For example, a center wavelength of the light emitted by the second light source(s) 63 is 940 nm. The film layers of the side-type backlight module have a high transmittance to light of the center wavelength, and the light of the center wavelength is easily realized under common process conditions, which may take into account a control of production costs while ensuring the effects of texture recognition.

Figure 15:
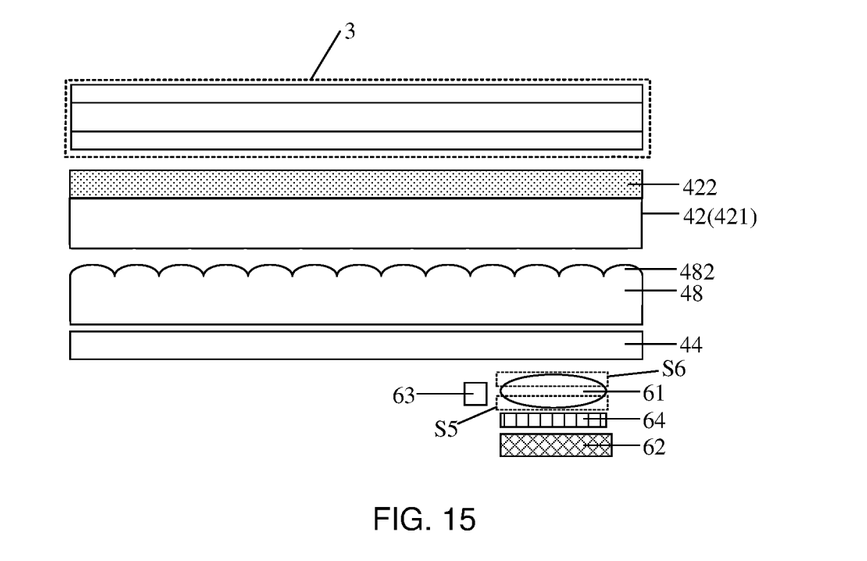
FIG. 15 is a structural diagram of still another liquid crystal display apparatus, provided in embodiments of the present disclosure.

In some embodiments, with reference to FIG. 15, the LCD apparatus further includes a filter layer 64. The filter layer 64 is disposed on a surface S5 of the lens layer 61 proximate to the texture recognition layer 62 or a surface S6 of the lens layer 61 away from the texture recognition layer 62. The filter layer 64 is used to filter light other than the light emitted by the second light source(s) 63.

For example, the filter layer 64 may be of a single-layer structure. The single-layer structure may be made of a filter material, and the used filter material can filter light other than the light emitted by the second light source(s) 63.

For another example, the filter layer 64 may be of a multi-layer structure. The multi-layer structure includes first filter layers and second filter layers that are alternately arranged. A refractive index of the first filter layers is less than a refractive index of the second filter layers. The first filter layers and the second filter layers may filter light other than the light emitted by the second light source(s) 63 by using the destructive interference principle of coherent cancellation.

In the embodiments of the present disclosure, the filter layer 64 may be used to filter light other than the light emitted by the second light source(s) 63, so that light received by the texture recognition layer 62 is only the light emitted by the second light source(s) 63. Therefore, light of other wavelengths is prevented from interfering with texture recognition, which ensures the texture recognition accuracy.

The description described above is merely specific implementations of the present disclosure, but the protection scope of the present disclosure is not limited thereto. Any changes or replacements that a person skilled in the art could conceive of within the technical scope of the present disclosure shall be included in the protection scope of the present disclosure. Therefore, the protection scope of the present disclosure shall be subject to the protection scope of the claims.

What is claimed is:

1. A side-type backlight module, comprising a light guide plate and a reverse prism sheet that are stacked, wherein
the reverse prism sheet includes a first prism, a surface of the first prism proximate to the light guide plate includes a plurality of prism structures substantially parallel to each other, each prism structure protrudes toward a direction approaching the light guide plate; and
a surface of the light guide plate proximate to the reverse prism sheet includes a plurality of strip-shaped microstructures substantially parallel to each other, each strip-shaped microstructure protrudes toward a direction approaching the reverse prism sheet, wherein
an extending direction of the prism structure crosses an extending direction of the strip-shaped microstructure,
wherein the reverse prism sheet further includes a second prism or an optical film that is disposed on a surface of the first prism away from the light guide plate; the second prism or the optical film is obtained by haze treatment, and a surface of the second prism or the optical film away from the first prism is a haze surface.

2. The side-type backlight module according to claim 1, wherein the strip-shaped microstructure is an arched structure, a top portion of the arched structure is toward the direction approaching the reverse prism sheet.

3. The side-type backlight module according to claim 1, further comprising: a first light source in a strip shape and a reflective sheet, wherein
the first light source is disposed on a side of the light guide plate, an extending direction of the first light source is the same as the extending direction of the prism structure; and
the reflective sheet is disposed on a surface of the light guide plate away from the reverse prism sheet.

4. The side-type backlight module according to claim 1, wherein a thickness of the second prism or the optical film is within a range of 5 μm to 7 μm, inclusive.

5. The side-type backlight module according to claim 1, wherein the prism structure has a protruding corner protruding toward the direction approaching the light guide plate; a section of the protruding corner taken along a direction perpendicular to the extending direction of the prism structure has two edges connected to each other, and an include angle between the two edges is within a range of 56 degrees to 75 degrees, inclusive.

6. The side-type backlight module according to claim 1, wherein a surface of the light guide plate away from the reverse prism sheet includes a plurality of wedge-shaped structures arranged at intervals.

7. The side-type backlight module according to claim 6, wherein a plane where a flat portion, without the plurality of wedge-shaped structures, of the surface of the light guide plate is located is a reference plane;
a wedge-shaped structure of the plurality of wedge-shaped structures includes a first inclined surface forming a first angle with the reference plane and a second inclined surface forming a second angle with the reference plane; the first angle and the second angle are both an acute angle; the first angle is greater than the second angle; and the second angle is within a range of 1 degree to 5 degrees, inclusive.

8. The side-type backlight module according to claim 6, wherein a distribution density of wedge-shaped structures of the plurality of wedge-shaped structures of the light guide plate at a position proximate to the first light source is less than a distribution density of the plurality of wedge-shaped structures of wedge-shaped structures of the light guide plate at a position away from the first light source.

9. A liquid crystal display apparatus, comprising:
the side-type backlight module according to claim 1,
a liquid crystal display panel disposed on a light exit side of the side-type backlight module, and
a texture recognition layer on a surface of the side-type backlight module away from the liquid crystal display panel.

10. The liquid crystal display apparatus according to claim 9, further comprising a lens layer, wherein
the lens layer is disposed between the texture recognition layer and the side-type backlight module.

11. The liquid crystal display apparatus according to claim 10, wherein the lens layer is a single lens or a lens group.

12. The liquid crystal display apparatus according to claim 11, wherein the single lens is an aspheric single lens.

13. The liquid crystal display apparatus according to claim 12, wherein an aspheric surface of the single lens is one of a quadric surface, an even-order aspheric surface and a free-form surface.

14. The liquid crystal display apparatus according to claim 10, further comprising at least one second light source, each second light source being disposed on a side of the lens layer, wherein the second light source is capable of emitting invisible light.

15. The liquid crystal display apparatus according to claim 14, wherein the second light source is capable of emitting infrared light or near-infrared light.

16. The liquid crystal display apparatus according to claim 14, wherein a center wavelength of the light emitted by the second light source is 940 nm.

17. The liquid crystal display apparatus according to claim 14, further comprising a filter layer, wherein
the filter layer is disposed on a surface of the lens layer proximate to the texture recognition layer or a surface of the lens layer away from the texture recognition layer, and the filter layer is used to filter light other than light emitted by the second light source.

18. The side-type backlight module according to any one of claim 1, wherein the extending direction of the prism structure is perpendicular to the extending direction of the strip-shaped microstructure.

* * * * *